Figure 1:
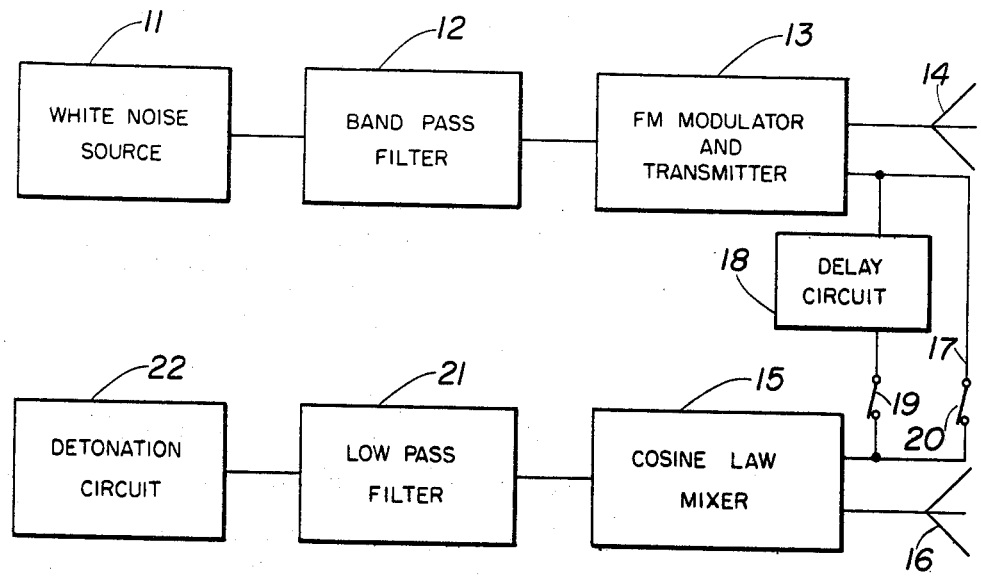

Dec. 31, 1968   A. E. RESNIK ET AL   3,419,861

RANDOM FREQUENCY MODULATION CORRELATION FUZE SYSTEM

Filed June 26, 1956

INVENTORS
ARNOLD E. RESNIK
WILLIAM F. WILLIAMS
BY
ATTORNEYS

_United States Patent Office_

3,419,861
Patented Dec. 31, 1968

3,419,861
RANDOM FREQUENCY MODULATION CORRELATION FUZE SYSTEM
Arnold E. Resnik, Ontario, and William F. Williams, San Fernando, Calif., assignors to United States of America as represented by the Secretary of the Navy
Filed June 26, 1956, Ser. No. 594,070
4 Claims. (Cl. 343—7)

The invention described herein may be manufactured and used by or for the Government of the United States of America for governmental purposes without the payment of any royalties thereon or therefor.

This invention relates to a fuze system and more particularly to a random frequency modulation correlation fuze system wherein the range attenuation characteristic is shaped by employing a multiplicity of delayed and undelayed signals to provide the desired shape of the range characteristic.

Sinusoidal and other types of periodic modulation have been previously used in frequency modulated Doppler fuze systems to give some range attenuation, but the cut-off in these systems has been very poor and ambiguous due to the periodic modulation.

A random frequency modulation correlation fuze system is disclosed in the co-pending application of Thomas B. Whiteley and Donald J. Adrian, Ser. No. 566,318, filed Feb. 17, 1956. This system utilizes band-limited random noise for frequency-modulating a carrier to provide rapid, unambiguous range cut-off in the Doppler signal obtained by mixing the transmitted signal with the echo-return signal from the target and filtering and rectifying the output; however, this system does not provide the optimum range characteristics for certain tactical conditions.

In the fuze system of the present invention a white noise source is utilized to provide a substantially uniform frequency band of noise at random frequencies which is passed through a band pass filter and used to frequency modulate the carrier frequency which is transmitted in the direction of the target. A portion of the transmitted signal is mixed with the return signal received from the target, the latter being phase modulated by the Doppler effect of the movement between the missile and the target.

In the present system the portion of the transmitted signal which is mixed with the return echo signal from the target consists of an undelayed signal and one or more delayed signals which are applied to a cosine law mixer along with the echo signal from the target. The output of the cosine law mixer provides the auto-correlation function of the power spectrum which is then passed through a low-pass filter which transmits the Doppler frequency output, and the Doppler output is then used to trigger the fuze with a suitable delay provided if desired. The envelope of the mixer output in the present invention provides an attenuation as the range is increased to a certain point at which the output rapidly falls off to zero.

One object of the present invention is to provide a fuze system having a rapid and unambiguous range cut-off with a definite amount of attenuation per foot in the range characteristic.

Another object of the present invention is to provide a Doppler fuze system in which the desired range characteristics may be obtained by employing a multiplicity of signals delayed and undelayed from the transmitter for mixing with the echo signal returned from the target.

A still further object of the present invention is to provide a random frequency modulation correlation fuze system wherein the desired range characteristics are obtained by the use of multiple reflections in a short delay line to obtain the equivalent of a long delay.

Figure 2:
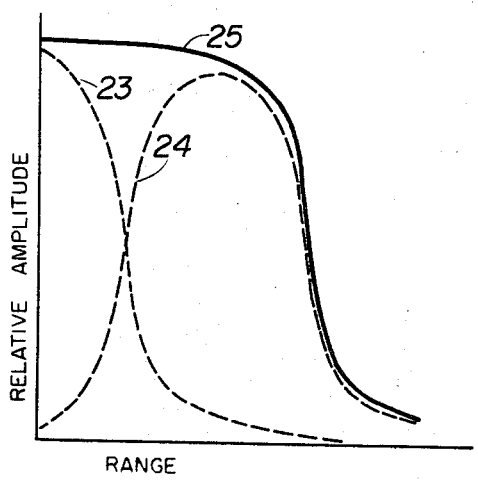
Figure 3:
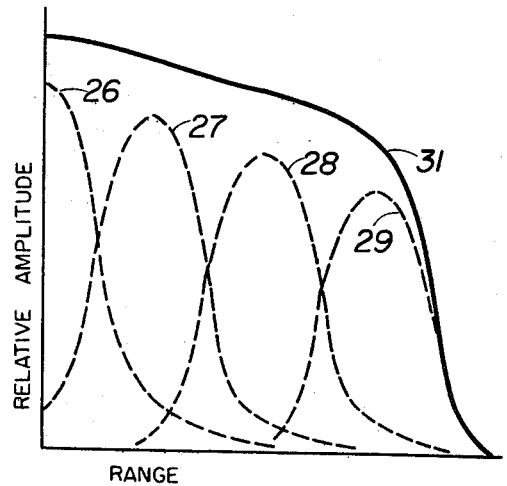

Other objects and many of the attendant advantages of this invention will be readily appreciated as the same becomes better understood by reference to the following detailed description when considered in connection with the accompanying drawings wherein:

FIG. 1 is a block diagram illustrating one preferred embodiment of the present invention wherein the delay circuit may be alternately employed as an open circuit delay or a short circuit delay and with or without a directly transmitted signal from the transmitter to the mixer;

FIG. 2 is a graph of relative amplitude versus range illustrating the operation and range characteristics of the circuit shown in FIG. 1 with the delay circuit directly connected between the transmitter and the mixer; and FIG. 3 is a graph of relative amplitude versus range illustrating the operation and range characteristics of the circuit illustrated in FIG. 1 with the delay circuit open to provide multiple reflections.

Referring now to the drawings in detail, one preferred embodiment of the present invention is illustrated in FIG. 1 wherein a white noise source 11 provides a continuous, uniform spectrum of random frequency noise which is passed through a band pass filter 12. The band of white noise which is passed through the filter 12 is utilized to modulate the carrier frequency in the frequency modulation modulator and transmitter 13 which transmits the noise-modulated frequency modulation signal in the direction of the target through the antenna 14.

The fuze of the present invention is assumed to be mounted in a moving missile which is guided in a path to approach the target with the radio frequency energy from the fuze being transmitted from the antenna 14 toward the target and a return echo signal being received therefrom through the antenna 16.

A portion of the transmitted energy is also applied to the cosine law mixer 15 through the connection 17 and also through the delay circuit 18 and through the switch 19 where it is combined with the return signal from the target aircraft which has been modified by the Doppler effect of the relative movement between the missile and aircraft and is received through the antenna 16 and applied to the cosine law mixer.

If it is desired to use the undelayed signal from the transmitter in combination with the delayed signal through the delay circuit 18, switch 20 may be left in the closed position. However, if it is desired to use the delayed signal alone, switch 20 can be opened to provide only a delayed signal from the transmitter for combining with the echo signal from the target received through antenna 16.

The output of the cosine law mixer 15 is passed through a low pass filter 21 which is set to pass all of the expected Doppler frequencies, and the output from the low pass filter 21 will provide a trigger signal when it reaches a suitable level on the relative amplitude curves illustrated in FIGS. 2 and 3 for firing the detonation circuit of the fuze 22.

Since the frequency of the Doppler signal is dependent on the relative velocity between the missile carrying the fuze and the target, these frequencies will vary in accordance with the tactical situation and the specific missile and targets anticipated. Therefore the Doppler amplifier will be set to pass the band of expected Doppler frequencies which would normally result from the tactical use of the particular missile in which the fuze will be used. Obviously this band may vary in different fuze applications.

The delay circuit 18, the connections between the transmitter 13 and the mixer 15, as well as the direct connection 17 and the switches 19 and 20 will vary in their physical construction depending on the frequency range of the particular fuze. In the micro-wave region the delay circuits and connections and switches may be in the form of wave guides and related components, whereas in the lower frequency regions lumped delay lines and conventional wiring and switches may be utilized.

The relative amplitude versus range characteristic curves illustrated in FIG. 2 shows the range characteristic of a simple noise-modulated frequency modulation fuze in the dotted line curve indicated by the numeral 23 which could be obtained with switch 19 opened and switch 20 closed. The curve 24 in dotted lines illustrates the range characteristic which would be obtained from the same fuze if the signal from the transmitter 13 to the mixer 15 is delayed as suggested in the co-pending application noted supra, which could be obtained with the block diagram of FIG. 1 by having switch 19 closed and switch 20 opened.

The envelope of the output of cosine law mixer 15 with both the delayed and undelayed signals from the transmitter 13 which would be obtained with both switches 19 and 20 closed is illustrated by the resultant curve 25 which provides a rapid and unambiguous cut-off beyond a certain point but provides a range attenuation over a substantial portion of the curve before cut-off.

With switch 20 in a closed position and switch 19 open, a different mode of operation would be obtained wherein the delay circuit 18 is open-circuited, and the delay circuit 18 will produce repeated reflections of the signal output from the transmitter, thus producing another type of range characteristic which is useful in a fuze as indicated in FIG. 3 wherein relative amplitude is plotted against range.

The dotted curve 26 indicates the range characteristic produced by the undelayed signal. The dotted curve 27 is produced by the signal traveling down the delay circuit 18 and returning; curve 28 is caused by the signal being reflected twice and curve 29 by the signal being reflected three times. After an arbitrary number of reflections, the signal will have been attenuated to the extent that the mixer will not function, and no signal output will result if the signal reflected from the target and entering antenna 16 at that time is small. In FIG. 3 this ocurs after the third passage down the delay line. By use of multiple reflections curve-shaping may be obtained to provide an attenuation of the range characteristics with relatively small delay lines.

If the target signal is large the range characteristic curve will be as illustrated in solid lines at 31 up to the time that curve 29 is generated at which time it is assumed that the target signal is greater than the delayed signal. Then the magnitude of the combined signals taken from the mixer 15 will be a function of the attenuation of the delay line. This will provide a means of inserting a definite amount of attenuation per foot in the range characteristic.

Obviously many modifications and variations of the present invention are possible in the light of the above teachings. It is therefore to be understood that within the scope of the appended claims the invention may be practiced otherwise than as specifically described.

What is claimed is:
1. A Doppler fuze system comprising means for transmitting a signal having a carrier modulated by random noise, means for mixing the return echo signal with an undelayed signal and a delayed signal from the transmitter, and means for deriving a trigger signal suitable for actuating the fuze from the output of said mixing means.

2. A fuze system comprising a noise source adapted to produce a uniform spectrum of random frequencies signals, a band pass filter operatively coupled to said noise source and adapted to pass a band of said noise, means for modulating a carrier frequency with said band of noise and transmitting a signal in the direction of the target, means for mixing a delayed and an undelayed portion of said transmitted signal with the return echo signal from a target, and means for utilizing the output of said mixer for actuating a fuze.

3. A fuze system comprising a noise source adapted to produce a uniform spectrum of random frequency signals, a band pass filter operatively coupled to said noise source and adapted to pass a sharply defined band of said noise, means including a modulator and transmitter for frequency modulating a carrier frequency with said band of noise and transmitting a signal in the direction of the target, means including a cosine low mixer for receiving signals from said transmitter and a return echo signal from a target, a direct connection between said transmitter and mixer, a delay circuit connected between said transmitter and mixer, and means of including a low pass filter adapted to pass the band of expected Doppler frequencies from the output of said mixer for actuating a fuze.

4. A fuze system comprising a noise source adapted to produce a uniform spectrum of random frequency signals, a band pass filter adapted to pass a sharply defined band of said noise from said noise source, means including a modulator and transmitter for frequency modulating a carrier frequency with said band of noise and transmitting a signal in the direction of the target, means including a cosine law mixer for receiving a portion of said transmitted signals and a return echo signal from the target, a direct connection between said transmitter and mixer, a delay circuit operatively connected with said direct connection to provide multiple reflections of said transmitted signal, and means including a low pass filter adapted to pass the band of expected Doppler frequencies from the output of said mixer for actuating a fuze.

References Cited

FOREIGN PATENTS 724,555  2/1955  Great Britain.
1,052,908  9/1953  France.

RODNEY D. BENNETT, *Primary Examiner.*

T. H. TUBBESING, *Assistant Examiner.*

U.S. Cl. X.R.

102—70.2